United States Patent [19]
Mays et al.

[11] Patent Number: 5,828,693
[45] Date of Patent: Oct. 27, 1998

[54] SPREAD SPECTRUM FREQUENCY HOPPING READER SYSTEM

[75] Inventors: Wesley M. Mays; Aaron J. Kam Siu; Mike D. Fontanarosa, all of Albuquerque, N. Mex.

[73] Assignee: Amtech Corporation, Dallas, Tex.

[21] Appl. No.: 621,724

[22] Filed: Mar. 21, 1996

[51] Int. Cl.⁶ .................................................. H04B 1/713
[52] U.S. Cl. .......................................................... 375/202
[58] Field of Search ........................... 375/202; 455/33.1, 455/33.4, 38.1; 370/320, 335, 342, 441

[56] References Cited

U.S. PATENT DOCUMENTS

| | | | |
|---|---|---|---|
| 4,850,036 | 7/1989 | Smith | 375/202 |
| 5,119,104 | 6/1992 | Heller | 375/202 |
| 5,377,222 | 12/1994 | Sanderford, Jr. | 375/201 |
| 5,394,433 | 2/1995 | Bantz et al. | 375/202 |
| 5,446,769 | 8/1995 | Shaver et al. | 375/202 |
| 5,459,759 | 10/1995 | Schilling | 375/202 |

*Primary Examiner*—Don N. Vo
*Attorney, Agent, or Firm*—Fish & Richardson P.C.

[57] ABSTRACT

An apparatus for sourcing an interrogation signal for use in a object identification system including a frequency hopping source for generation of an interrogation signal which is coupled to a homo dyne radio for transmission by a bi-directional antenna to a tag. Upon receipt, the tag provides a return signal that is backscatter modulated to include tag identification or other data which is processed by the sourcing system. The frequency hopping source includes a voltage controller oscillator which is driven by a pseudo random code generator for selecting one of a plurality of hopping frequencies at which the interrogation signal is to be generated based on the available bandwidth.

20 Claims, 10 Drawing Sheets

SPREAD SPECTRUM FREQUENCY HOPPING READER SYSTEM

This invention relates to the field of remote identification of objects, and more particularly to method and apparatus for remote identification of moving objects in a multi-lane reader system.

BACKGROUND OF THE INVENTION

Shipping containers, railroad cars and automobiles need to be identified while they are in use, often while moving. Systems useful for remote identification using active or passive "tags", which backscatter modulate a continuous wave reflecting a modulated signal having a digital identification code, have been described in U.S. Pat. Nos. 4,739,328 and 4,888,591, assigned to the same assignee as this invention. The backscatter modulated signal is received, usually by the same system which transmitted the original signal (source) and the digital code is demodulated and decoded, providing identity information which may be processed as desired.

In many applications of these systems, there are several tagged objects near each other whose information must be processed simultaneously. In these kinds of systems, a plurality of "readers", one per vehicle "lane" in the system, are employed as sources of the transmitted signal to be received by a tag. Each of these readers radiates (sources) an "interrogation signal" which, when received by a tag in its respective lane, is backscatter modulated for reflection back to the associated reader. Each reader in the system must radiate over a sufficiently large area to assure that a read occurs for any tag within its lane. However, the interrogation signal generated in one lane must not interfere with adjacent lane interrogation signals because such interference may cause a "interference region" where overlapping signals cancel each other out. Tags entering the interference region will not receive an interrogation signal, and thus will not return any signal to an associated reader for processing.

One good example is in an automobile toll road collection lane system. A separate reader, i.e. transmitter-receiver, is normally used for each lane. Alternatively, a single transmitter-receiver transmitting multiple, different signals may be used, having separate transmitter and receiver antennas for each lane. The lane-specific antenna or transmitter-receiver must be capable of sourcing an interrogation signal to any tag within its respective lane while not interfering with signals sourced in adjacent lanes.

In the past, many different techniques for assuring non-interference of the interrogation signals have been used. Spacing may be employed between lanes to act as a buffer region where overlaps may occur safely. Alternatively, adjacent readers can be sourced at different frequencies which are spaced sufficiently apart based on the bandwidth of the interrogation signal. Another solution is to operate adjacent readers intermittently (time domain multiple access (TDMA)), either in regular intervals or only upon detecting the presence of a tag to be read.

While spacing between lanes may solve the problem, it becomes impractical when a large number of lanes are to be used. Using different frequencies also has its limitations based upon the available bandwidth in the broadcast band of the reader (source). In the United States and Hong Kong, these systems are typically operated in the ISM band at 902 to 904 Mhz and 909.75 to 921.75 Mhz with receive signals having a bandwidth of 2 Mhz. Accordingly, two frequencies from the upper band may be selected for use by adjacent readers, resulting in a system having readers sourcing different frequency interrogation signals in adjacent lanes. However, in some environments, sufficient bandwidth may not be available. In addition, even where the bandwidth is available, a two reader system requires twice the readers, necessarily increasing costs. In addition, since the readers are different frequencies, end users are required to spare both reader types to replace any failed reader with the same type, resulting in further increased costs. Finally, time domain solutions require complicated and costly sequencing and detection schemes. Typical applications require anywhere from 6 to 24 lanes of simultaneously processed data, making implementation impractical.

It is desired to provide a single reader per lane in a multiple lane system in which the readers are spaced physically close together, resulting in overlapping of interrogation signals, and where such interrogation signals do not substantially interfere with an adjacent reader's interrogation signal.

BRIEF DESCRIPTION OF THE INVENTION

In summary, an apparatus is provided for sourcing an interrogation signal for use in a object identification system. The system of the invention includes a frequency hopping source for generation of an interrogation signal which is coupled to a homo dyne radio for transmission by a bi-directional antenna to a tag. Upon receipt, the tag provides a backscatter modulated return signal to include tag identification or other data which is processed by the sourcing system. The frequency hopping source includes a voltage controlled oscillator which is driven by a pseudo random code generator for selecting one of a plurality of hopping frequencies at which the interrogation signal is to be generated based on the available bandwidth.

DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DESCRIPTION

Figure 1:
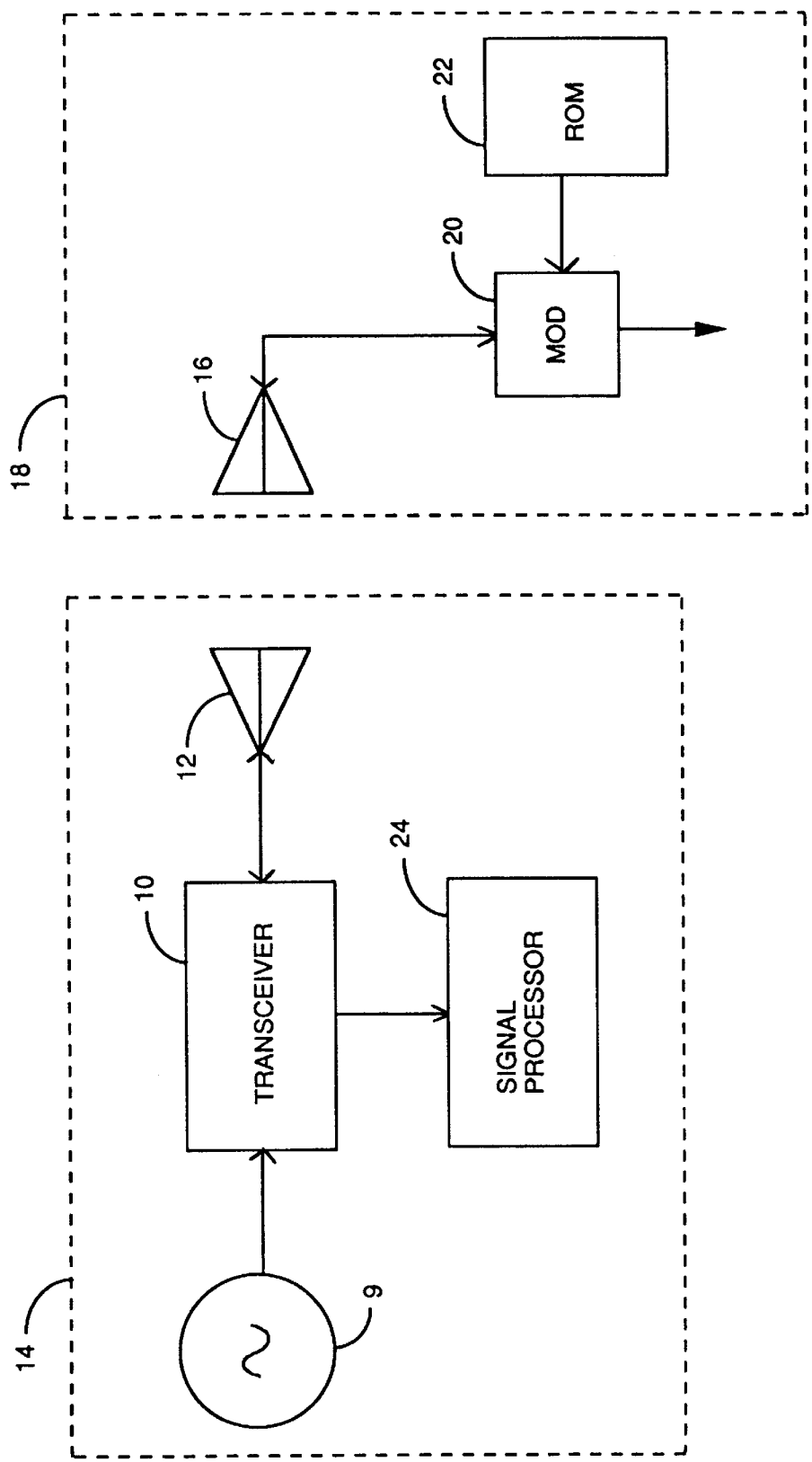
FIG. 1 is a schematic diagram of a reader and electronic tag according to one embodiment of the present invention.

Referring to FIG. 1, a source 9 for generating interrogating radio frequency (RF) signals is connected to a transceiver 10 at a reader generally indicated at 14. The interrogating RF signal from the source 9 may have a suitable frequency such as 915 MHz. When the source 9 is energized, transceiver 10 transmits the interrogating RF signal through antenna 12 to a suitable antenna 16 (such as a di-pole antenna) at a electronic tag (transponder) 18. The transponder 18 is associated with an object (not shown) and is used to identify the object. The transponder 18 includes a data source such as a read only memory (ROM) 22, which provides a sequence of binary 1's and binary 0's in an individual pattern to identify the object.

A binary "1" in the read only memory 22 causes a modulator 20 to produce a first plurality of signal cycles and a binary "0" in the read only memory 22 causes the modulator 20 to produce a second plurality of signal cycles different from the first plurality of signals. The pluralities of signals cycles sequentially produced by the modulator 20 to represent the pattern of binary 1's and binary 0's which identify the object are introduced to the dipole antenna 16 for transmission to antenna 12 at reader 14.

Antenna 12 introduces the received signals to transceiver 10 for processing by signal processor 24. Signal processor 24 produces signals in a sequence having a pattern identifying the pattern of the 1's and 0's in read only memory 22 at transponder 18. The sequence may be compared in reader 14 with a desired sequence to determine whether the object being identified is being sought by the reader or not.

The system described above represents the prior art on a simplified basis. Such a system is disclosed in U.S. Pat. No. 4,075,632 issued on Feb. 21, 1978 to Howard A. Baldwin, Stephen W. Depp, Alfred R. Koelle, and Robert W. Freyman and assigned of record to the United States of America as represented by United States Department of Energy. The assignee of record of this invention has obtained rights from the United States Government under U.S. Pat. No. 4,075,632 to make, have made, use and sell the invention of that patent.

Figure 2:
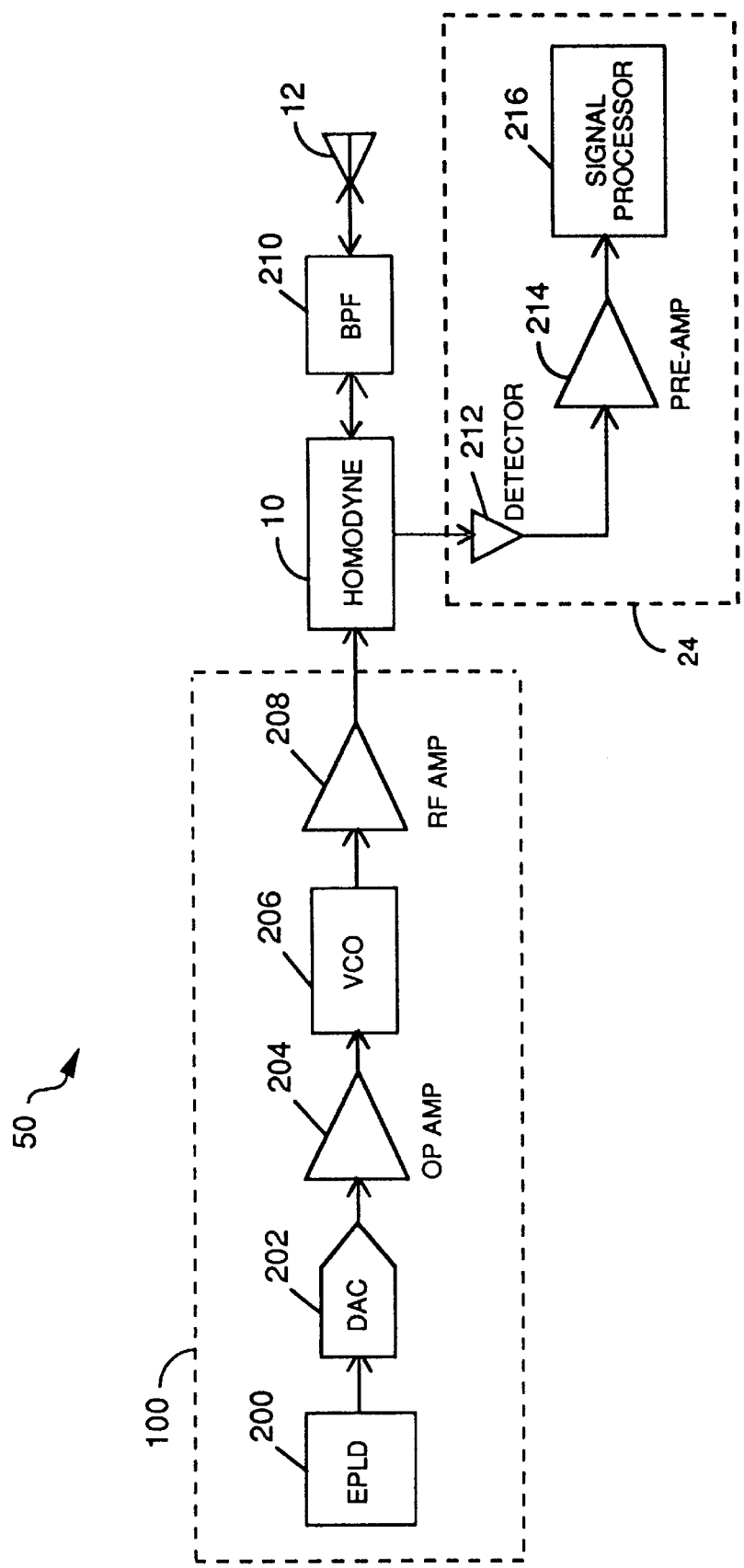
FIG. 2 is a schematic diagram of a reader according to one embodiment of the present invention.

The system of the present invention employs a reader, generally indicated at 50, which is shown in detail in FIG. 2, and which may be considered to be similar in some details to that shown in FIG. 1 and described above. Reader 50 generates an interrogation signal for transmission to an electronic tag (not shown). Reader 50 is comprised of a frequency hopping source, generally indicated at 100, including an electrically programmable logic device (EPLD) 200 which serves as a pseudo random code generator whose output is introduced into a digital to analog converter (DAC) 202. The output signal from EPLD 200 is a digital word associated with a selected state of a pseudo random sequence derived by EPLD 200. In one embodiment, the output signal from EPLD 200, passed to DAC 202, has 12 bit resolution to eliminate phase noise which may be generated with lower bit precision digital to analog conversion of the pseudo random code sequence. EPLD 200 will be discussed in greater detail below in conjunction with FIG. 3.

DAC 202 converts the input received from EPLD 200 from a digital signal to an analog signal. In one embodiment, a twelve bit DAC, part number AD7245AAR produced by Analog Devices, Inc, is used.

The output of DAC 202 is introduced as an input to op amp 204. Op amp 204 is a level translator which takes the signal level received from DAC 202 and converts it to a level appropriate for controlling a voltage controlled oscillator (VCO) 206. In one embodiment, op amp 204 is amplifier part number LT1210, produced by Linear Technology, Inc.

The gain of op amp 204 is tuned by trimming a set pots (not shown) coupled to op amp 204. Specifically, an upper set point in op amp 204 is set by processing an all "1's" condition received from DAC 202. The set pot is adjusted to drive the output of op amp 204 to the desired high output level in the presence of the all "1's" condition. Thereafter, a lower set point is set by processing an all "0's" input from DAC 202 to op amp 204. A trimming pot (not shown) associated with this low output state is adjusted to drive the output to the desired low output level in the presence of the all "0's" condition. Finally, a mid set point is set by processing an an alternating "1's" and "0's" input from DAC 202 to op amp 204. A trimming pot (not shown) associated with this mid level output state is adjusted to drive the output to the desired mid level output in the presence of the alternating pattern.

In one embodiment, a thermal stabilization network (not shown) is coupled to op amp 204 to prevent temperature drift of the op amp output over the operating temperature range of the reader 50. A negative thermal coefficient resistive network may be used to perform the thermal stabilization, or other stabilization network as is known in the art.

The output of op amp 204 is introduced into voltage controlled oscillator (VCO) 206, which varies the frequency of the interrogation signal generated by reader 50. In one embodiment, VCO 206 provides a 902–928 MHz frequency output signal. The output power of VCO 206 is approximately −2 to 2 dBm. The tuning coefficient for the VCO 206 is approximately 10 MHz per volt.

The output of VCO 206 is introduced into radio frequency (RF) amplifier 208. RF amplifier 208 boosts the VCO output signal to approximately 30 dBm. The output of the RF amplifier 208 is introduced into a transceiver 10. In one embodiment, transceiver 10 is a homodyne transceiver. Transceiver 10 will be discussed in greater detail below in association with FIG. 5.

The output of transceiver 10 is coupled to a bandpass filter (BPF) 210 whose output is in turn coupled to antenna 12. In one embodiment, the bandpass filter is part number 0915c45335, produced by Motorola Ceramics Division, Inc. This completes the transmit portion of the reader 50.

The modulated interrogation signal received back from the electronic tag (not shown) is received at antenna 12 and coupled to transceiver 10. The modulated RF signal is passed to a detector 212 whose output is amplified by a preamplifier 214 prior to input into a signal processor 216. Detector 212 and preamplifier 214 will be discussed in greater detail below in associated with FIG. 5. Signal processor 216 will be discussed in greater detail below in conjunction with FIG. 6.

Figure 3:
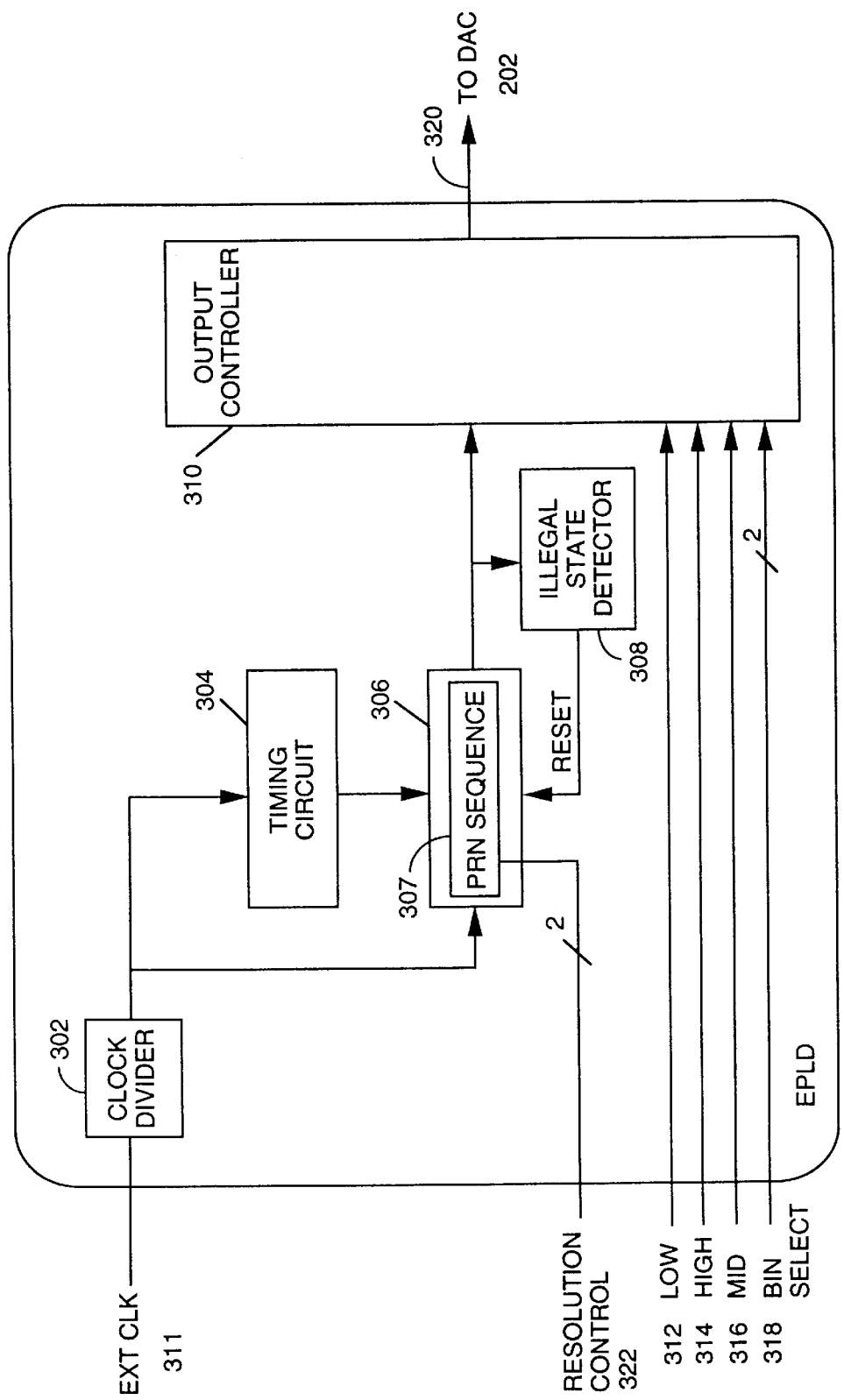
FIG. 3 is a schematic diagram of the pseudo random code generator of FIG. 2.

Referring now to FIG. 3, EPLD 200 includes a clock divider 302, timing circuit 304, PRN sequence generator 306, illegal state detector 308 and output controller 310. An external clock signal 311 is coupled to an input of clock divider 302. Clock divider 302, timing circuit 304 and external clock signal 311 determine dwell time between frequency hops for reader 14 (FIG. 1). Dwell time refers to the amount of time an output signal (in this case the interrogation signal) is driven at a selected frequency prior to hopping to another frequency within the frequency range of the frequency hopping source 100 (FIG. 2). Clock divider 302 adjusts the external clock signal 311 as required to achieve the desired dwell time. In one embodiment, external clock 311 is user selectably divisible into ½ rate, ¼ rate, ⅛ rate, or 1/16 rate by clock divider 302. In one embodiment, hardware jumpers or dip switches are used to select the dwell time, alternatively, this may be accomplished in software.

Timing circuit 304 is a fixed timing circuit, providing an enable signal based on the clock signal provided by clock divider 302. In the one embodiment, the dwell time associated with timing circuit 304 is set at 175 milliseconds, and the external clock is a 6 MHz clock.

The output of clock divider 302 is provided as an input to timing circuit 304 and as an input to a PRN sequence generator 306. PRN sequence generator 306 outputs a digital signal representative of a single state of a PRN sequence 307 generated therein. PRN sequence generator 306 is user configurable. Specifically, resolution control signal 322 determines the number of states over which the output of the PRN sequencer will vary. In one embodiment, PRN sequence 307 comprises 128 states, of which 127 are actively generated and one state is deemed illegal. The output of PRN sequence generator 306 is a seven bit signal associated with the current entry in PRN sequence 307 for output by output controller 310. In one embodiment, PRN sequence generator 306 is part number A1010, manufactured by the ACTEL, Corp.

Illegal state detector 308 detects the presence on the output of PRN sequence generator 306 of the illegal state. Upon detection of the illegal state, illegal state detector 308 resets PRN sequence generator 306. The illegal state is a by-product of the design of PRN sequence generator 306. Specifically, PRN sequence generator 306 is comprised of a series of cascaded gates with one or more feedback loops. At various locations in the series of cascaded gates, based on the polynomial being implemented, signals are read or tapped resulting in a output signal representative of the state of the PRN sequence generator. At each clock cycle, PRN sequence generator enters into a new state. Because of the feedback loops, the new state is dependent on the last state of the PRN sequence generator 306. The cascaded gate structure is such that, one state or output signal in the PRN sequence, if issued, will result in the reissuance of the same state as the new state, effectively locking up the gates in the PRN sequence generator 306. Accordingly, upon the issuance of this state (the illegal state) by PRN sequence generator 306, a resetting of PRN sequence generator 306 must be performed. The illegal state detector avoids this lock-up condition by resetting PRN sequence generator 306.

The output of PRN sequence generator 306 is introduced to output controller 310. Output controller 310 includes an pseudo random code output signal 320 which is coupled to DAC 202. Output controller 310 also receives three external inputs (312, 314, 316) associated with control signals for driving pseudo random code output signal 320 to an all "0's" condition, an all "1's" condition, or an alternating "1" and "0" condition, respectively. The all "0's", all "1's", and alternating condition states are used in conjunction with tuning op amp 204 (FIG. 2) as described above.

In addition, a bin select signal 318 is received as an input by output controller 310. Bin select signal 318 defines a range over which pseudo random code output signal 320 operates. In one embodiment, pseudo random code output signal 320 includes 512 different states (channels) for operation by frequency hopping source 100 (FIG. 2). The bin selection signal is used to divide the 512 states into four bins or groups of 128 channels respectively.

For example, a bin selection signal of 00 (binary) will result in an output signal from 0.0 volts to 1.0 volt, with 128 steps in between, on the output from output controller 310 to DAC 202. Similarly, if the bin select signal 318 is set to 01 (binary), then the output from output controller 310 to DAC 202 will vary over 1.0 to 2.0 volts with 128 steps in between. A bin selection signal of 10 (binary), will result in an output signal varied over the range of 2.0 to 3.0 volts, with 128 steps in between. Finally, a bin select signal of 11 (binary), will set the output from output controller 310 to DAC 202 at between 3.0 and 4.0 volts, with 128 steps in between. In one embodiment of the present invention, each bin represents approximately a 5 Mhz range over which the interrogation signal is generated, with 128 individual operating frequencies in the range which may be selected (assuming an operating bandwidth of between 904 and 924 Mhz and a four bin system).

In one embodiment, guard bands may be inserted at each end of the spectrum over which the frequency hopping source 100 (FIG. 2) is to be operated. The guard bands are inserted to prevent an output from VCO 206 (FIG. 2) which is outside the spectrum. Specifically, in one embodiment, a guard band of approximately 2 MHz at each end of the spectrum (between 902–904 MHz and between 924–926 MHz) is provided to assure that spread spectrum signals generated by frequency hopping source 100 (FIG. 2) do not fall outside the ISM band (assuming a typical 2 Mhz bandwidth interrogation signal). The output signal from the output controller 310 is adjusted to accommodate for such guard band regions (for example, by providing an offset bias on pseudo random code output signal 320 associated with this guard band region). Alternatively, the level transition performed by the DAC 202 (FIG. 2) may be biased to compensate for the guard band regions.

In another embodiment, guard bands may be inserted between each bin selectable by frequency hopping source 100 (FIG. 2). Specifically in one embodiment, a 1 megahertz guard band is inserted between each bin, so as to assure that overlap or interference between adjacent sources may be minimized. In one embodiment, the pseudo random code output signal 320 generated by output controller 310 may again be adjusted to provide for these guard bands between the individual bins selectable by bin selection signal 318. Alternatively, the level adjustment performed by DAC 202 may accommodate these intermediate guard regions.

Figure 4:
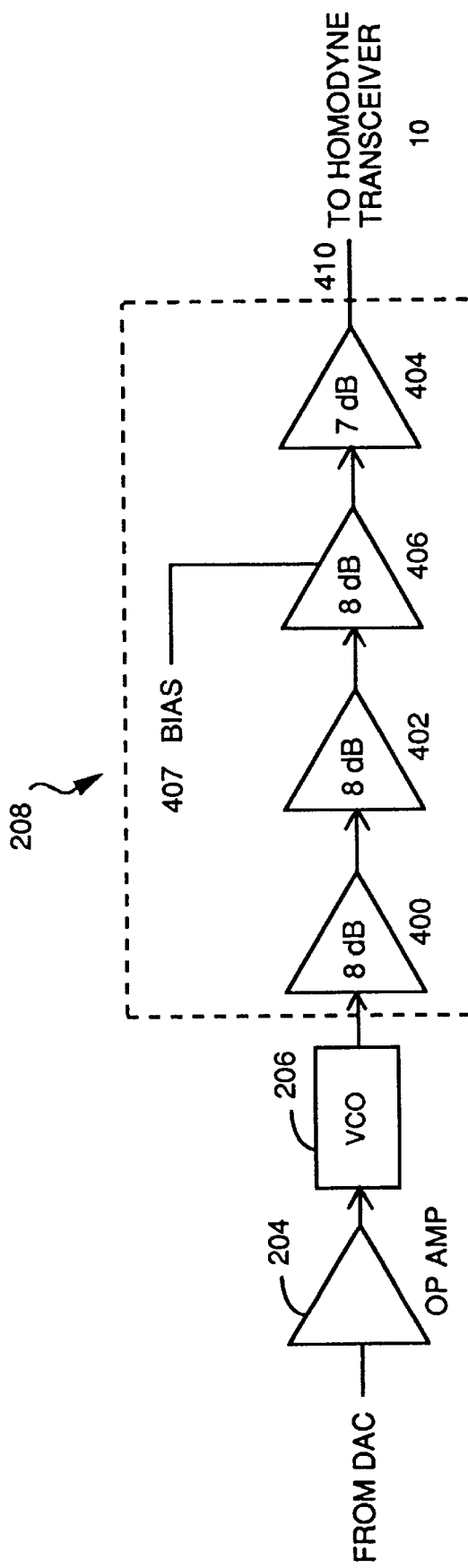
FIG. 4 is a schematic diagram of the RF section of the reader of FIG. 2 according to one embodiment of the present invention.

Referring now to FIG. 4, a more detailed view of RF amplifier 208 is shown. Specifically, RF amplifier 208 includes first, second and third amplifiers 400, 402 and 404, and an adjustable gain amplifier 406 for providing an rf output signal 410. In one embodiment, first amplifier 400 is a part number MSA1105 amplifier, produced by Hewlett Packard, Inc.; second amplifier 402 is a part number NE46134 amplifier, produced by Nippon Electronic Company, Inc.; third amplifier 404 is part number BLU86 amplifier, produced by Phillips; and finally adjustable gain amplifier 406 is part number NE46134, produced by Nippon Electric Company, Inc. Adjustable gain amplifier 406 includes a bias adjustment signal 407 for reducing the output power and adjusting the gain for RF amplifier 208. In one embodiment, the −2 to 2 dBm output signal provided from VCO 206 is amplified to a level of approximately 29.5 dBm at the output of RF amplifier 208 (rf output signal 410) prior to input to transceiver 10 (FIG. 1).

Figure 5:
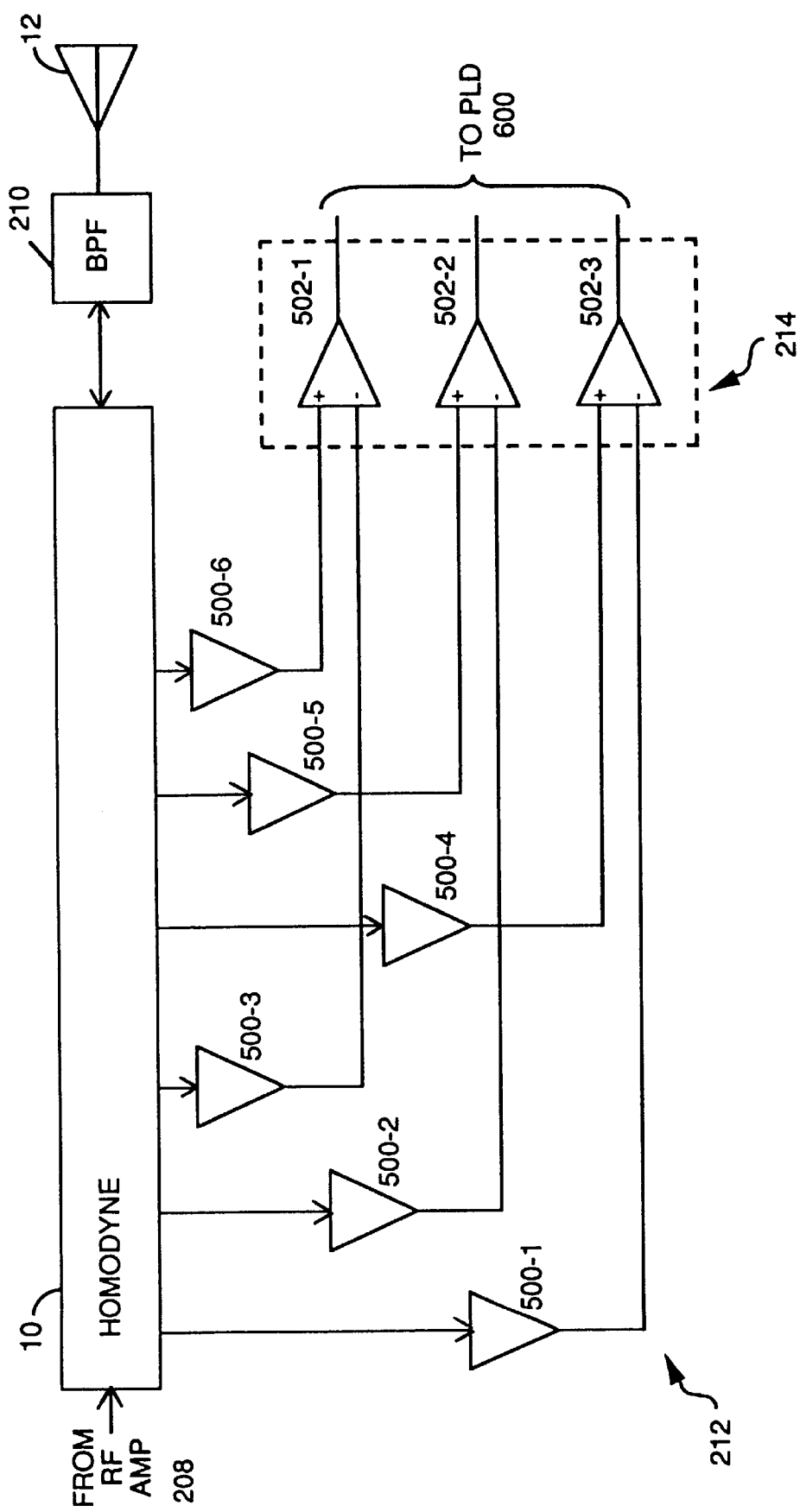
FIG. 5 is a schematic diagram of the homodyne transceiver and detector of FIG. 2 according to one embodiment of the present invention.

Referring to FIG. 5, rf output signal 410 from RF amplifier 208 is coupled to transceiver 10. In one embodiment, transceiver 10 is a homodyne transceiver. Transceiver 10 transmits rf signals (interrogation signals) from frequency hopping source 100 (FIG. 2) to the electronic tag (not shown). Attached to transceiver 10 is a detector, generally indicated at 212, comprising six diode detectors 500-1 through 500-6 spaced along the transceiver transmission line at thirty degree intervals, respectively. Outputs from diode detectors 500-1 through 500-6 are coupled to a preamplifier, generally indicated at 214. In one embodiment, diode detectors are tuned detectors including a resident RC tank circuit, part number HSMS2802, produced by Hewlett Packard, Inc.

In one embodiment, preamplifier 214 includes three differential amplifiers 502-1 through 502-3. The outputs of detectors 500-1 through 500-6 are connected to the inputs of differential amplifiers 502-1 through 502-3 in a manner such that each differential amplifier includes inputs offset by 90 degrees. Specifically, the output of detector 500-1 is provided as an input to the negative input terminal while the output of detector 500-4 is provided to the positive input terminal of differential amplifier 502-3. The output of detector 500-2 is provided as an input to the negative input terminal while the output of detector 500-5 is provided as an input to the positive input terminal of differential amplifier 502-2. Finally, the output of detector 500-3 is provided as an input to the negative input terminal while the output of detector 500-6 is provided as an input to the positive input terminal of differential amplifier 502-1.

Detector 214 above has been described in relation to a three channel system. Specifically, three separate channels associated with the data returning from the electronic tag are provided which are 90 degrees out of phase from each other. The three channel system was selected to eliminate the possibility of an interference condition arising at the transceiver due to the destructive interference of the transmitted interrogation signal and the electronic tag return signal. Alternatively, other channel configurations for detector 214 may be realized, depending on the performance required in the reader 50 (FIG. 2).

The output of differential amplifiers 502-1 through 502-3, associated with preamplifier 214, are provided as inputs to a programmable logic device (PLD) 600 for processing. Referring to (FIG. 6), PLD 600 detects frame markers associated with the beginning of a frame as well as decodes the identification information in the return signal provided by an associated electronic tag (not shown). PLD 600 includes a pair of buffers 602 and 604. Buffers 602 and 604 provide temporary storage of data decoded by PLD 600. In one embodiment, PLD 600 detects frame ID information as well as decodes the bit cycles of the 20 kHz and 40 kHz cycle patterns generated from the electronic tag (not shown). PLD 600 looks at two out of three inputs received from preamplifier 214 (FIG. 5) to determine whether valid data has been received.

In a three channel system, approximately ninety percent of the time all three channels will include data. However, in the event that an interference condition arises in the reflected modulated signal returning from an electronic tag, one of the channels may contain invalid data. Accordingly, a two out of three polling process is performed in the PLD 600 to compensate for interference conditions. When an entire frame has been decoded, PLD 600 generates an interrupt for transmission to a microcontroller 610. Microcontroller 610 responds to the interrupt, providing a clock signal for clocking the data out of the PLD 600 to the microcontroller 610.

Associated with microcontroller 610 are three memory elements, read only memory (ROM) 612, random access memory (RAM) 614, flash memory 616, and a real time clock 618. Memory elements 612 through 616 are used to store program information for operating microcontroller 610. Specifically, ROM 612 includes an interrupt sequence for handling the interrupt received from the PLD 600 upon the completion of decoding an entire frame of data. In addition, ROM 612 may include application programs associated with the processing of identification data. In one embodiment, an application program results in a comparison of the frame ID data received from the PLD 600 with data stored in RAM 614 associated with an electronic tag which is expected to be read. Microcontroller 610 makes a comparison to the expected tag frame data stored in RAM 614 and thereafter stores the result of the comparison in a portion of RAM 614.

Flash memory 616 is used as a cache for assisting microcontroller 610 in the execution of the application programs. Real time clock generator 618 oversees two-way communication between memory units 612, 614, and 616, respectively, and microcontroller 610. Finally, an RS232 communications port 620 is provided for communicating with a base station (not shown) for either down loading or up loading of information.

Figure 7:
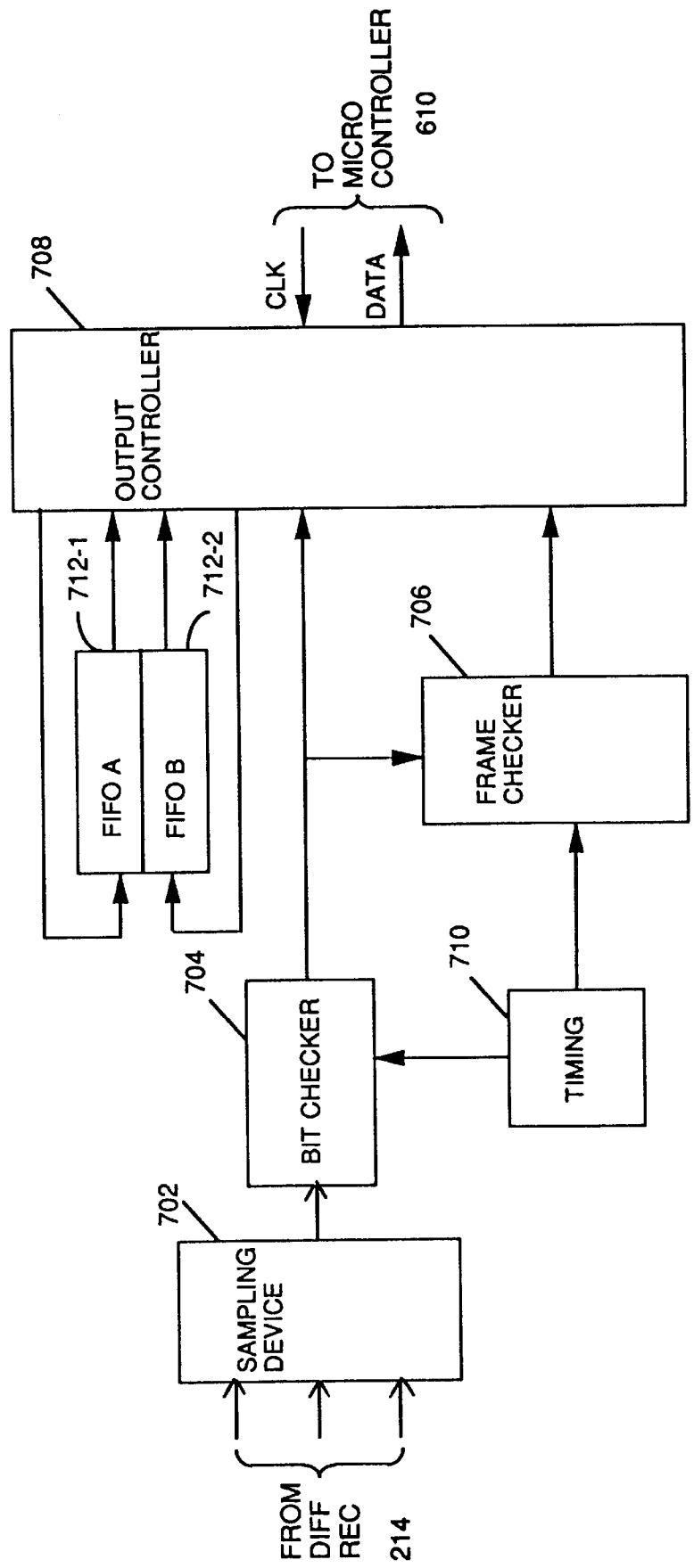
FIG. 7 is a schematic diagram of the programmable logic device of FIG. 6 according to one embodiment of the present invention.

Referring to FIG. 7, a detailed view of PLD 600 is shown, including decoder sampling device 702, bit checker 704, frame checker 706, output controller 708, and timing element 710. Associated with output controller 708 are first and second first-in-first-out (FIFO) buffers 712-1 and 712-2.

Sampling device 702 receives inputs from preamplifier 214 (FIG. 5) and samples the three channels looking for interference conditions in any of the given channels. Sampling device provides a single data stream input representative of the received data as an input to bit checker 704.

Bit checker 704 determines the presence of a valid data bit. Specifically, bit checker 704 checks for predetermined sequences of 20 kHz and 40 kHz cycle signals associated with a valid "0" or "1" data byte (two 20 khz cycles followed by a 40 khz cycle for a "1", and one 20 khz cycle followed by two 40 khz cycles for a "0"). In the event the bit is valid, the bit is transferred to output controller 708.

Frame checker 706 includes a register (not shown) for keeping track of the most recent data in order to identify a valid frame marker. Specifically, frame checker 706 includes a FIFO (not shown) which is 128 bits in length for storing consecutive bits outputted by bit checker 704. Frame checker 706 compares value stored in the FIFO for a match with a predetermined frame marker stored in a second register (not shown) in frame checker 706. Upon the identification of a valid frame marker, frame checker 706 outputs an interrupt to output controller 708, indicating that a valid frame marker has arrived.

Output controller 708 receives the output bits generated by bit checker 704 and sequentially places each bit in a first one of FIFO buffers 712-1 and 712-2. Upon receipt of a valid frame marker interrupt from frame checker 706, the output controller begins a countdown associated with the completion of an entire frame of data. Output controller continues to stuff data into the first one of the FIFO buffers 712-1 and 712-2 until a full frame has been transferred. At that time, output controller 708 generates an interrupt to microcontroller 610 indicating that an entire frame of data has been received and is ready for processing. Thereafter, output controller 708 loads data from bit checker 704 into the second one of the FIFO buffers 712-1 and 712-4. Accordingly, microcontroller must service the interrupt from output controller 708 prior to the second FIFO filling in order to assure no data will be lost. Upon receipt of a clock signal from microcontroller 610, the contents of the first FIFO will be loaded to microcontroller 610.

Having described the details of the reader 50 above, the operation of reader 50 in conjunction with a electronic tag in a single and multi-lane configuration will be described.

Figure 6:
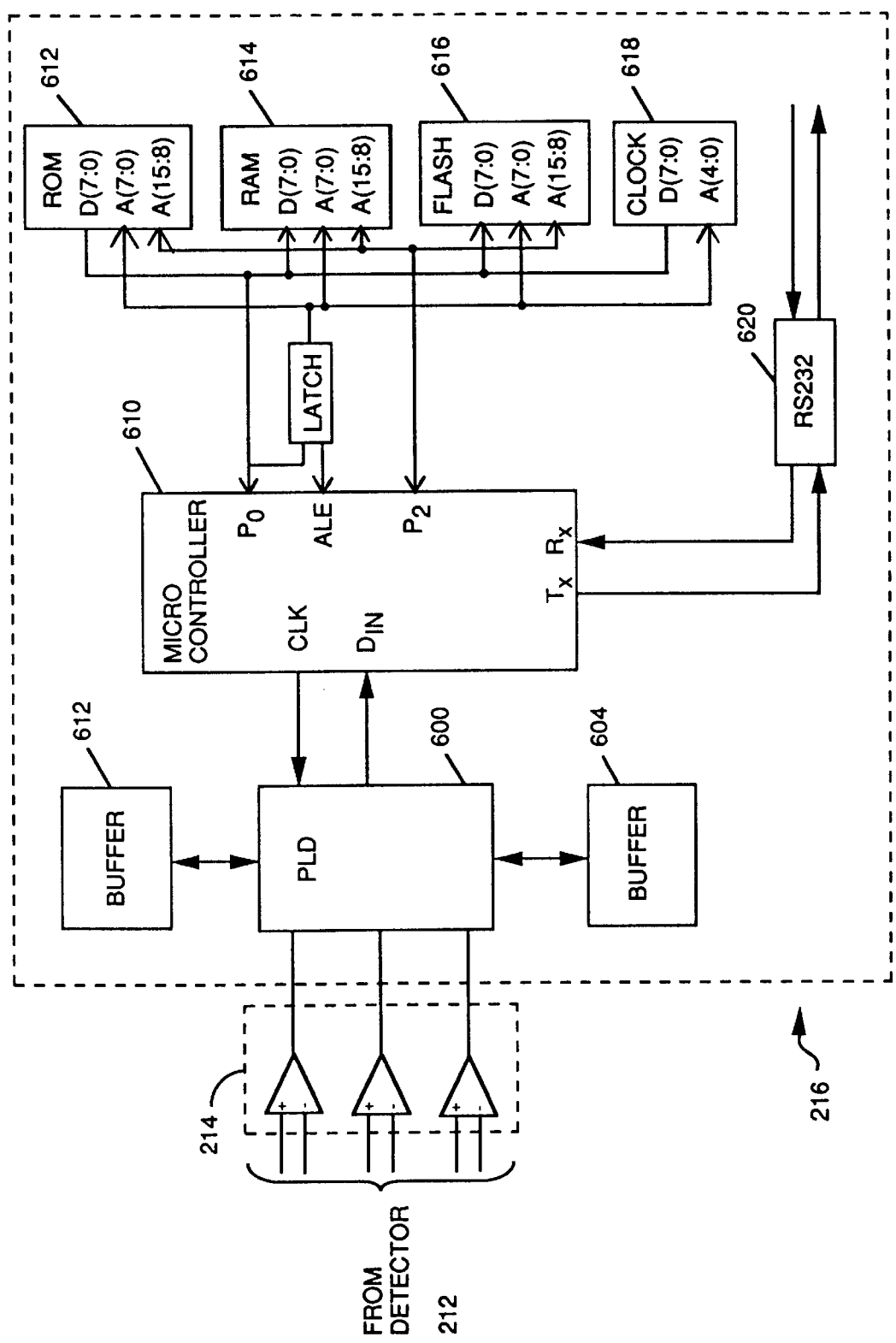
FIG. 6 is a schematic diagram of the signal processor of FIG. 2 according to one embodiment of the present invention.

Referring to FIGS. 1 and 2, in a single reader implementation, reader 50 generates a interrogation signal having a frequency which is varied over a range of frequencies in a selected frequency band. The interrogation signal is generated by a frequency hopping source 100 and transmitted through a homodyne transceiver 10 to an electronic tag 18. Electronic tag 18 modulates ID information stored therein and returns an encoded signal back to reader 50 for processing. Specifically, electronic tag 18 backscatter modulates the interrogation signal, providing an amplitude modulated return signal associated with the ID stored in the ROM 22 associated with electronic tag 18. The modulated signal is returned to homodyne transceiver 10. Detectors 212 detect and PLD 600 (FIG. 6) decodes the ID information so that the ID information may be passed to the microcontroller 610 (FIG. 6).

Figure 8A:
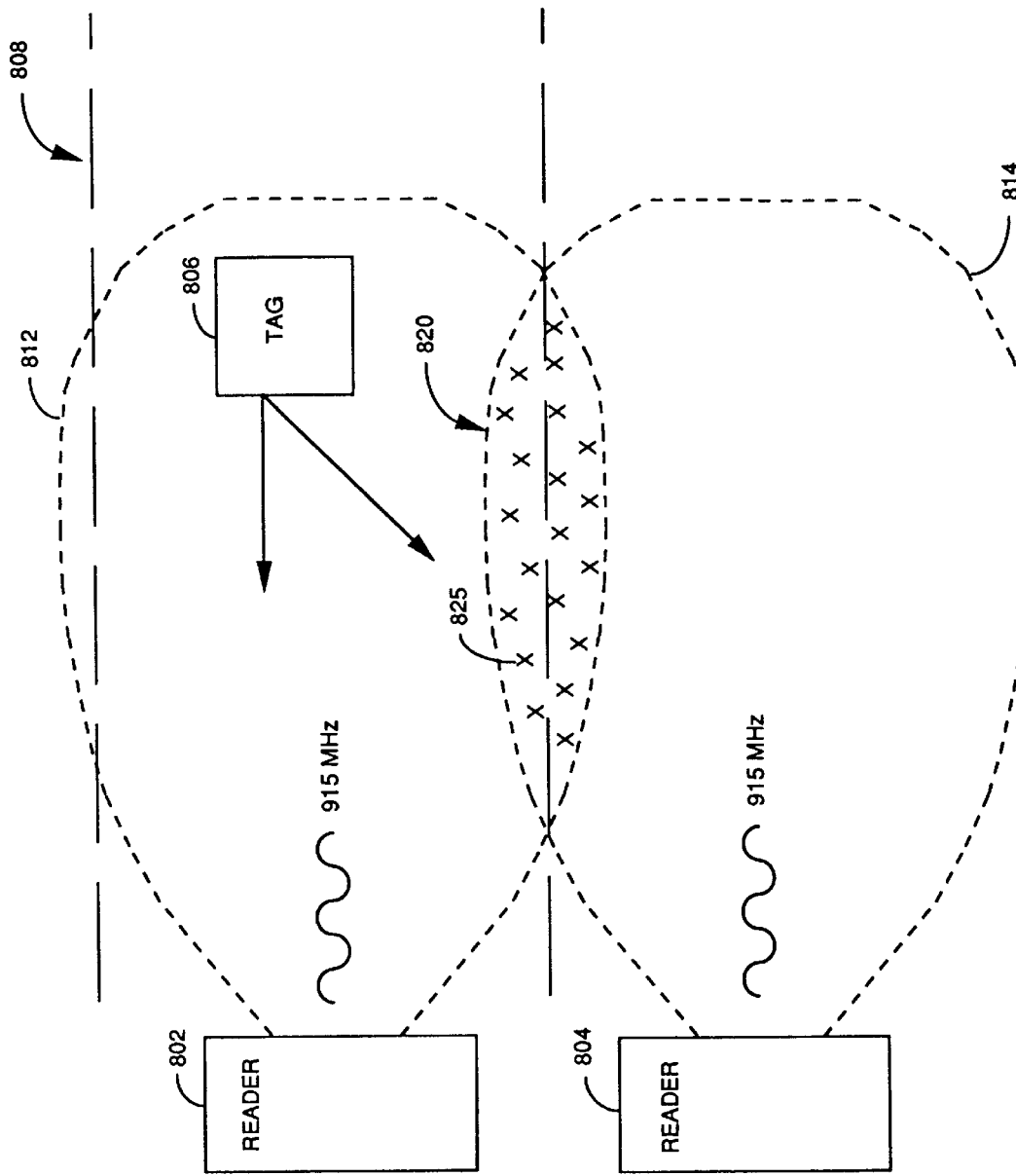
FIG. 8A is a schematic diagram of a prior art multi-lane identification system.

Referring to FIG. 8A, a multi-lane electronic tag reading system is shown. A multi-lane system includes two or more adjacent readers. For the purposes of this discussion, a two-reader system will be described. Those ordinarily skilled in the art will recognize that the principles disclosed herein are equally applicable to three or more lane systems. In the two lane system shown, a reader 802 is in close proximity to a second reader device 804, both of which generate interrogation signals of approximately 915 Mhz. An electronic tag 806 is located in the first lane generally indicated at 808.

Two specific problems arise in multi-lane systems, interference and false signals. Interference refers to the destructive interference of interrogation signals generated by adjacent readers resulting in a "blind" spot in which electronic tags may not be read. Specifically, reader 802 has an associated envelope region 812, which defines an area in which electronic tags may be identified. Reader device 804 has associated with it envelope region 814. In prior art, multi-lane systems, an overlap region generally indicated by 820 exists at the boundary between a respective pair of reader devices. The overlap region includes interference points 825 which arise at points of destructive interference between interrogation signals generated by reader devices 802 and 804.

The second problem, false signals, arises due to reflections and the high gain configurations of the reader devices. Typically, reader devices 802 and 804 provide approximately 1 watt of power out to an electronic tag, which in return provides a backscatter modulated rf signal of a few microwatts. Accordingly, because of the very small power output of the electronic tag, the receiver in the reader device must be very sensitive. The high sensitivity requirement for the reader device necessitates a very large separation between RF channels used by adjacent readers. Typically, while the bandwidth of the amplitude modulated RF return signal is only 120 kilohertz, approximately 2 megahertz of band width is required for channel to channel separation to avoid overlap. Accordingly, where the reader devices are operated at approximately the same frequency, false signals may be detected.

In operation, reader device 802 generates an interrogation signal which is received by electronic tag 806. Electronic tag 806 backscatter modulates the interrogation signal and returns a modulated signal to the reader device 802 for decoding. The backscatter signal generated by electronic tag 806 is also radiated and picked up by reader device 804. As described above, due to the sensitive receiver in reader device 804, a false frame reading may occur. Utilizing the frequency hopping reader of the preferred embodiment of the present invention provides a solution to the false reading and interference problems.

Figure 8B:
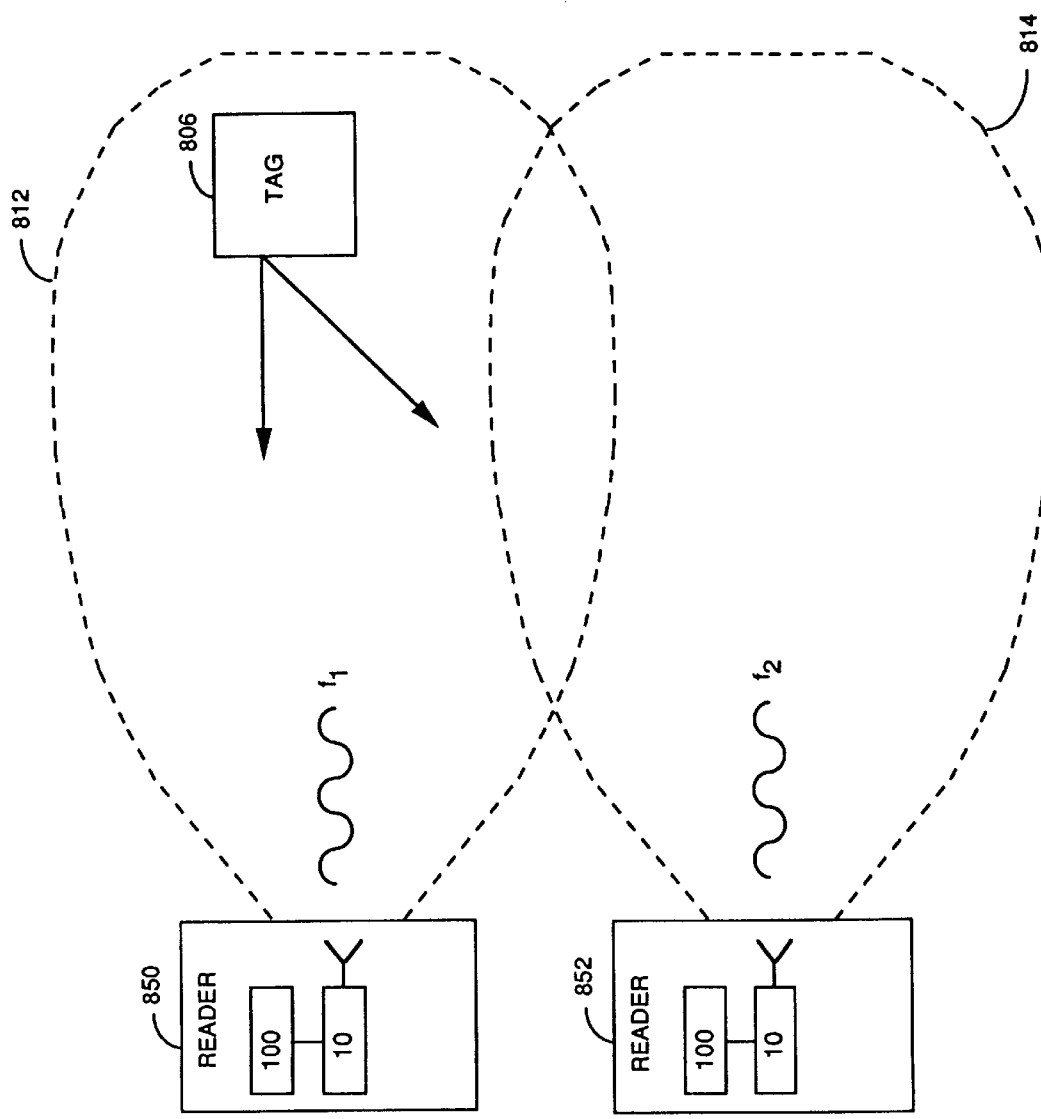
FIG. 8B is a schematic diagram of a multi-lane identification system incorporating frequency hopping sources in adjacent readers according to one embodiment of the present invention.

Referring to FIG. 8B, a multi-lane system incorporating a frequency hopping reader according to one embodiment of the present invention is shown. Specifically, a first reader 850 is provided with a frequency source 100 capable of hopping between 902 and 928 Mhz and includes a first pseudo random sequence stored therein. A second reader 852 is provided in a second lane which also includes a similar frequency hopping source 100 and the same pseudo random sequence. Assuming that approximately a 2 MHz band width is required, only 7.5 percent of the frequency band (in a 902–928 Mhz ISM band system) is occupied by a given frequency reader at a given point of time.

In one embodiment, guard bands are inserted at each end of the spectrum resulting in 20 Mhz bandwidth over which the frequency hopping sources operate (904–924 MHz region of the ISM band). In this embodiment, 10 percent of the total available bandwidth is occupied at a given time (assuming a 2 Mhz bandwidth signal). This configuration will result in first reader 850 occupying a first 2 MHz region of the frequency spectrum while second reader 852 occupies a different 2 MHz of the spectrum approximately ninety percent of the time the system is in use. Accordingly, the interference problem described above will not arise in this configuration due to the frequency separation created between adjacent lanes. In addition, the false signal problem will also be eliminated because of the detection scheme used by (homodyne) transceiver 10 (FIG. 1) which mixes the output interrogation signal with the received rf return signal from a responding tag. Accordingly, no false signal will be detected by the adjacent reader device.

Statistically, given the pseudo random sequences, ten percent of the time the frequency hopping sources associated with first and second readers 850 and 852 will occupy an overlapping region of the overall bandwidth, possibly resulting in interference between adjacent devices. Interference between the two devices may result in a blank or dead spot arising in the lanes which makes the ID information from the electronic tag unreadable. One way of minimizing the opportunity for such interference is to reduce the dwell time for one of the two frequency hopping readers. Accordingly, in one embodiment, the dwell time for one reader is set at half that of the dwell time associated with the other reader. In one embodiment, the frequency hopping source 100 (FIG. 2) in first reader 850 has a dwell time set to approximately 175 milliseconds, while the frequency hopping source 100 of second reader 852 has a dwell time set to approximately 350 milliseconds. Accordingly, a system configured for varying dwell times allows for hopping out of interference conditions quickly.

A problem arises in using the same pseudo random code in each of the frequency hopping source reader devices. Specifically, if the same pseudo random code is used, then as time runs by, eventually both the frequency hopping sources will be executing the same portion of the pseudo random code. Accordingly, if an interference arises at one location in the code based on the frequency selected by each individual reader, at the next hopping time the same interference may occur. Accordingly, until the readers drift apart over time, any interference problem will not be resolved by a mere frequency hop.

In one embodiment of the present invention, each reader is provided with a second pseudo random code. Upon the detection of an interference condition, one or both readers may jump to an entry in the second pseudo random code. In this embodiment, the probability for overlap between the adjacent readers is approximately 1%.

Alternatively, a random generator may be included in each pseudo random code generator to allow for a jump to a random location in the pseudo random code sequence. Again, the odds of jumping back to an interfering region of the frequency spectrum is reduced to approximately 1%.

Figure 9:
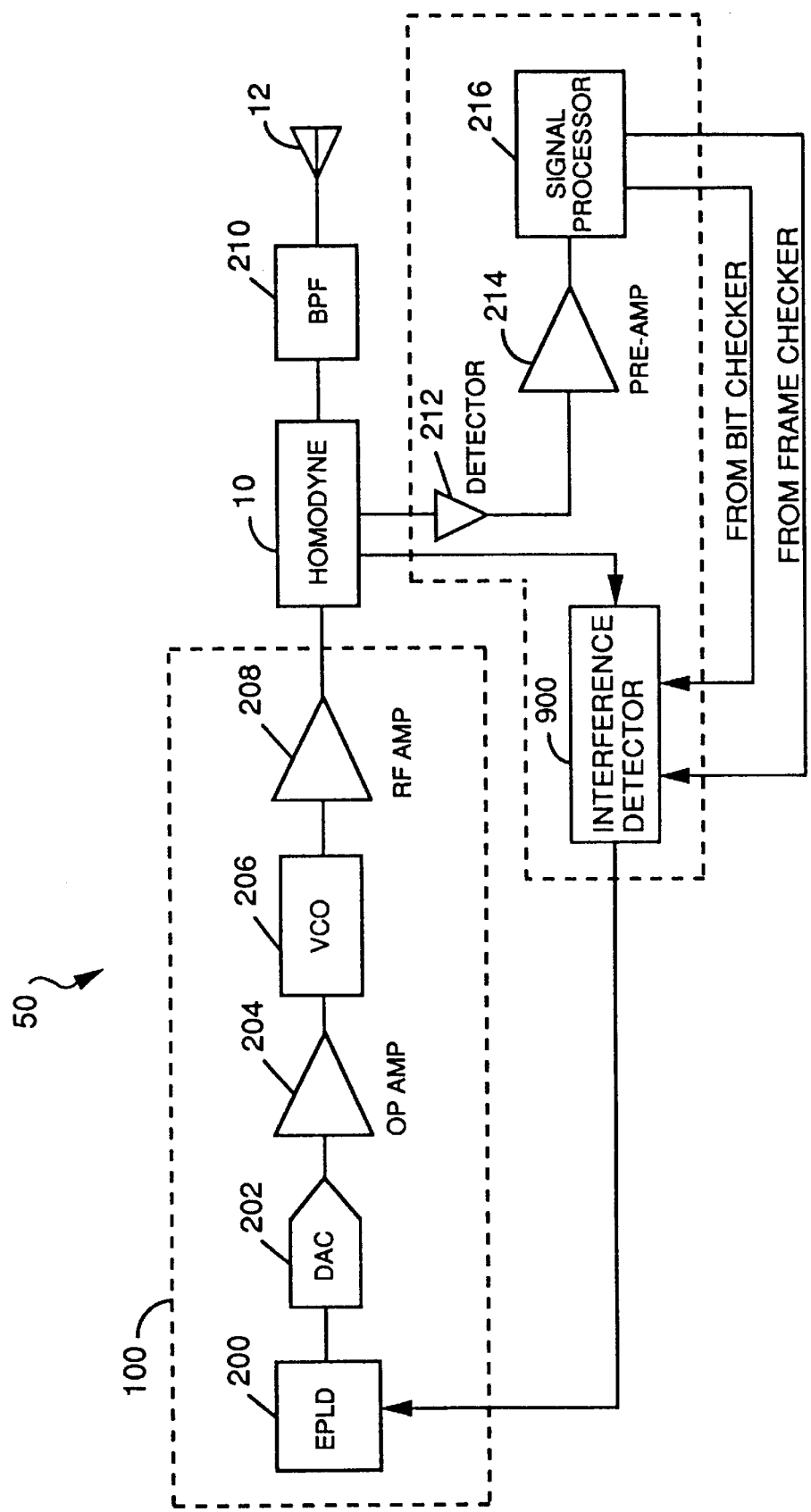
FIG. 9 is a schematic diagram of a detector for detecting interference conditions according to one embodiment of the present invention.

Referring now to FIG. 9, interference is detected by an interference detector 900 coupled to transceiver 10 (FIG. 1). Detection is performed by evaluating the presence of the interrogation signal on the transceiver output (intermediate frequency (IF) energy is being transmitted by transceiver 10) and looking at the returned ID data. The detector detects the presence of IF energy. In the decode process, bit checker 704 (FIG. 7) senses invalid bits and, upon detecting such, sends a status bit to detector 900. Frame checker 706 (FIG. 7) also sends an interrupt to detector 900 indicating a valid frame marker has been decoded. In one embodiment, upon the detection of one or more invalid bits after a frame marker interrupt has been received, detector 900 checks the IF energy output. If the IF energy is high, then an enable signal is transmitted to EPLD 200 (FIG. 2) resulting in a jump to a random location in either the same pseudo random sequence or a second pseudo random sequence. If the IF energy is low then no jump is performed.

In an alternative embodiment, detector 900 includes an intermediate frequency power detector (not shown) for detecting the transmission of the interrogation signal and a radio frequency detector (not shown) for detecting the presence of a radio frequency signal returned from an electronic tag. In this embodiment detector 900 triggers jumping to a non sequential code entry in the pseudo random code upon detecting no radio frequency return signal while the intermediate frequency power detector indicates the presence of an interrogation signal. Detection may be performed by directional couplers, diode detectors or other means as is known in the art.

Another solution to the slow drift problem is to adjust the dwell time for alternating units in a multi-lane system to different levels. In this manner, when overlap and interference between adjacent reader devices occurs, it will not last as long.

In one embodiment of the present invention, the opportunity for interference is minimized further by using bin select signal 318 (FIG. 3). Specifically, bin selection signal 318 is programmed to select a unique bin for adjacent reader devices. Accordingly, first reader 850 (FIG. 8) is selected to frequency hop over a first range of frequencies (4 Mhz range in a 4 bin system over a 20 Mhz bandwidth with no intermediate guard bands), while second reader 852 (FIG. 8) is selected to frequency hop over a second different range of frequencies. In one embodiment, 128 frequency selections are made within a given 4 MHz bin for a particular reader. Adjacent readers are programmed with a different bin location, providing an interrogation signal which is varied over a second different range of frequencies in the ISM band. Accordingly, interference between the devices does not occur. In addition, false readings between the devices is minimized.

In summary, an apparatus of the invention provides a source interrogation signal for use in a object identification system. The system of the invention includes a frequency hopping source for generation of an interrogation signal coupled to a homodyne radio for transmission by a bi-directional antenna to a tag. Upon receipt, the tag provides a return signal that is backscatter modulated to include tag identification or other data which is processed by the sourcing system. The frequency hopping source includes a voltage controlled oscillator which is driven by a pseudo random code generator for selecting one of a plurality of hopping frequencies at which the interrogation signal is to be generated based on the available bandwidth.

The present invention as been described in terms of a preferred embodiment. The invention, however, is not limited to the embodiment depicted and described. Rather the scope of the invention is defined by the claims which follow.

What is claimed is:

1. A reader for use in an interrogation system, the reader generating a radio frequency signal to be returned by an electronic tag when the tag enters a predefined envelope region associated with the reader, the reader comprising:

a radio frequency source outputting a radio frequency signal at one of a plurality of frequencies within a frequency range;

means for hopping the radio frequency signal according to a first sequence among the plurality of frequencies in the frequency range;

a detector for detecting destructive interference in a return signal from an electronic tag located within an envelope region associated with the reader; and a controller operating to vary the hopping upon the detection of destructive interference in the return signal.

2. The apparatus of claim 1 where the radio frequency source is a voltage controlled oscillator.

3. The apparatus of claim 1 wherein the means for hopping the radio frequency source hops between the pluralities of frequencies in a pseudo random manner.

4. The apparatus of claim 3 wherein the means for hopping includes a pseudo random code generator.

5. The apparatus of claim 4 wherein the pseudo random code generator includes
   a first pseudo random code including a plurality of code entries; and
   a timing circuit receiving as an input a clock signal, the timing circuit controlling the sequential outputting of the code entries in the first pseudo random code, the outputted code entries controlling the frequency at which the radio frequency source outputs the interrogation signal.

6. The apparatus of claim 1 wherein
   the frequency range is divided into a plurality of bins, each of which defines a sub-range of frequencies; and
   the controller includes a bin selector for selecting one of the plurality of bins such that the interrogation signal is outputted at a frequency within a sub-range of frequencies associated with the selected one of the plurality of bins.

7. The apparatus of claim 6 wherein the radio frequency source hops between frequencies in the sub-ranges of frequencies in a pseudo random manner.

8. The apparatus of claim 7 wherein the means for hopping the radio frequency source further includes a pseudo random code generator, the pseudo random code generator outputting a code entry for selecting a frequency within the sub-range of frequencies.

9. The apparatus of claim 6 further including
   means for guarding against transmissions outside the frequency range including guard bands at each end of the frequency range; and wherein the interrogation signal has a first bandwidth and the guard bands are at least half as wide as the first bandwidth.

10. The apparatus of claim 6 wherein the frequency range includes one or more guard bands, the guard bands separating adjacent bins in the frequency range.

11. The apparatus of claim 1 further including means for adjusting a dwell time at which the radio frequency source remains at a first frequency before hopping to a next frequency in the frequency range.

12. The apparatus of claim 5 further including means for outputting a non sequential code entry in the first pseudo random code upon a predetermined condition.

13. The apparatus of claim 12 further including means for detecting interference with another radio frequency source, and where the predetermined condition includes interference with another radio frequency source.

14. The apparatus of claim 1 further including
means for selecting sequential code entries from a second sequence upon a predetermined condition, and for selecting sequential code entries from the first sequence upon a next occurrence of the predetermined condition.

15. The apparatus of claim 14 wherein the predetermined condition includes interference with another radio frequency source.

16. The apparatus of claim 1 wherein the controller operates to vary the hopping by varying a dwell time for the reader.

17. The apparatus of claim 1 wherein the controller operates to vary the hopping by initiating a non-sequential hop in the first sequence upon detection of destructive interference.

18. The apparatus of claim 1 wherein the controller operates to vary the hopping by initiating hopping according to a second sequence upon detection of destructive interference.

19. The apparatus of claim 1 wherein the frequency range is divided into a plurality of bins; and the controller includes a bin selector operable to cause the radio frequency source to output a plurality of frequencies within a selected bin and wherein the controller operates to vary the hopping by enabling a new bin selection.

20. A reader for reading data from an electronic tag comprising:

a bi-directional antenna;

a frequency hopping source for generating an interrogation signal at a frequency within a frequency range according to a first sequence;

a homodyne radio for transmitting the interrogation signal to the electronic tag through the antenna and for receiving a radio frequency signal returned from the electronic tag;

means for processing the radio frequency signal to decode the data from the electronic tag; and a controller operating to vary the hopping of the frequency hopping source to minimize occurrences of interference among adjacent readers.

* * * * *